Jan. 30, 1951  C. O. SCHILLING  2,539,638
METHOD OF DEFLUORINATING ROCK PHOSPHATE
Filed Jan. 11, 1945
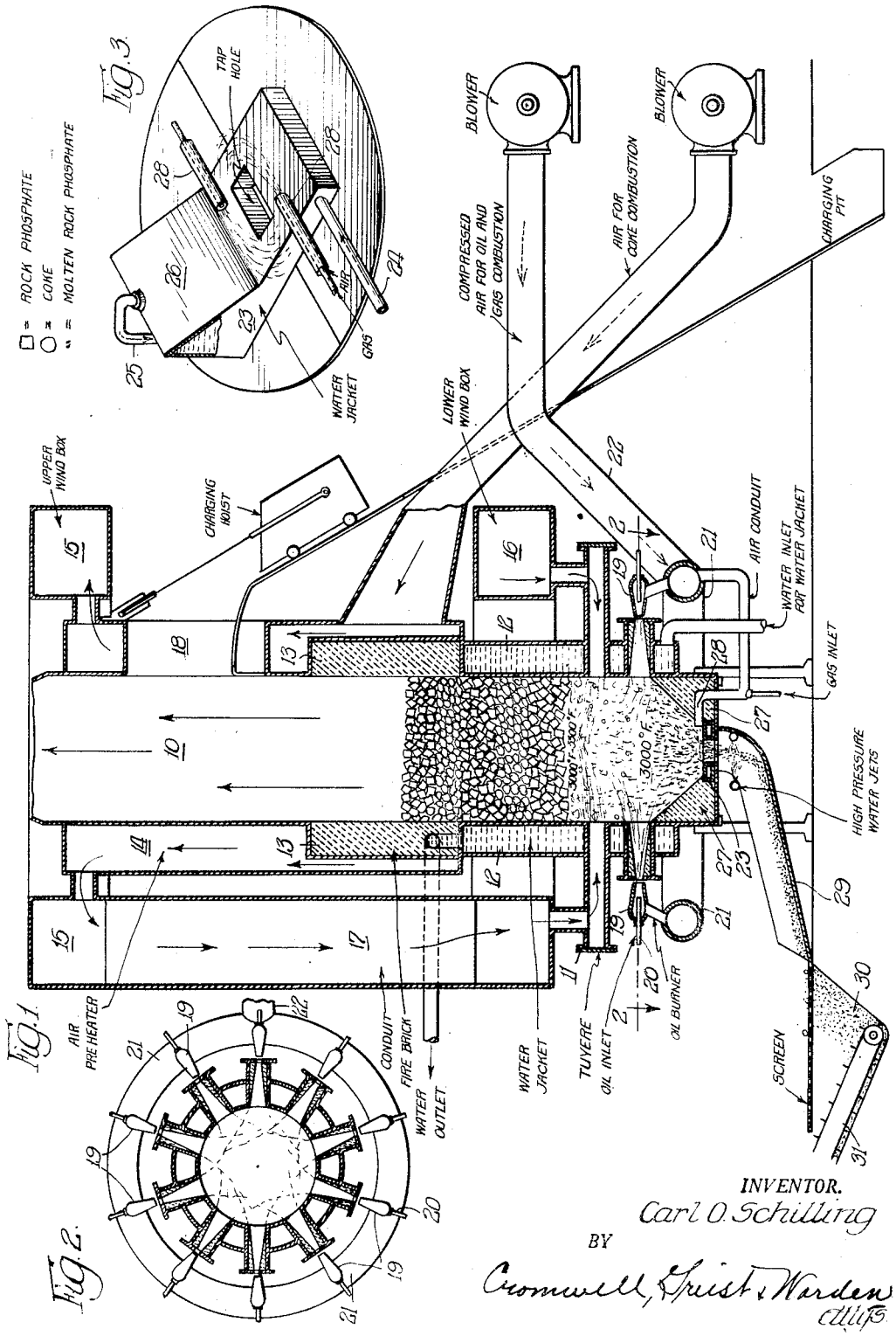
INVENTOR.
Carl O. Schilling
BY
Cromwell, Greist & Warden Patented Jan. 30, 1951

2,539,638

UNITED STATES PATENT OFFICE 2,539,638

METHOD OF DEFLUORINATING ROCK PHOSPHATE

Carl O. Schilling, Kansas City, Mo., assignor to Moorman Manufacturing Company, Quincy, Ill., a corporation of Illinois Application January 11, 1945, Serial No. 572,400

3 Claims. (Cl. 23—108)

The present invention relates to the treatment of phosphatic materials. More particularly, it pertains to a process and apparatus for defluorinating rock phosphate to recover calcium phosphate suitable for use in animal feed.

In the prior art various means and methods are disclosed for the treatment of rock phosphates to prepare commercial compounds for fertilizing purposes. The possibility of utilizing rock phosphates as a constituent of mineral feeds has also been recognized but the toxic character of the phosphate rock, cost of refining, and the problem of palatability have prevented rock phosphate and the products thereof from attaining commercial success as an animal feed. In this connection it has been suggested that fluorine be removed by calcining processes, sintering processes, and combinations of both. It has also been suggested that rock phosphates be melted by various types of furnaces but because of the difficulties resulting from freeze-ups, the particular combustion materials used, the inability always to remove the proper amount of fluorine, and other disadvantages, these suggestions have not proved commercially acceptable.

The present invention is not a calcining or sintering process. It does contemplate the reduction of rock phosphates to a molten state, however, and embodies a novel process and apparatus for the treatment of such rock for the substantially complete removal of fluorine therefrom.

Generally, it is an object of the invention to provide a process and apparatus for the defluorination of rock phosphate which will overcome the foregoing difficulties and disadvantages and to recover calcium phosphate in an economical and facile manner by melting the rock phosphate by utilizing solid carbonaceous fuel as a primary source of heat to remove the bulk of the fluorine present, then immediately utilizing a hydrocarbon fluid fuel as a source of water vapor, which also acts as a catalyst, and as a secondary source of heat in removing residual fluorine present in the molten rock, and continuously recovering the molten rock initially in the form of slag.

More specifically, it is an object of the invention to provide a process and apparatus for defluorinating rock phosphate to recover calcium phosphate suitable for use in animal feed by charging coke and rock phosphate into a furnace to maintain a burden of such materials, continuously igniting the coke and maintaining a temperature above the melting point of the rock phosphate in a zone at the bottom of the burden in order to remove from the rock phosphate a substantial portion of the fluorine through the burden, and immediately passing the resulting molten rock through a secondary zone heated by a fluid hydrocarbon fuel providing a sufficient amount of moisture vapor which will react with residual fluorine in the molten material substantially to eliminate the same, the heated secondary zone producing sufficient heat to prevent freezing of the molten material and to permit the same continuously to be recovered initially in the form of slag for further treatment which will transform the slag into finely divided particles.

Another object of the invention is to provide a furnace of the type herein described with a continuously open water-jacketed tap hole whereby continuously to permit the recovery of molten rock initially in the form of slag as it leaves the furnace.

A further object of the invention is the provision of means for a furnace of the type herein described for accumulating air which becomes preheated as the result of ignition and burning of combustion gases and returning the preheated air to a primary heating zone in the furnace.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description, taken in connection with the accompanying drawing, in which:

Fig. 1 is a somewhat diagrammatic representation of a preferred apparatus for practicing the invention, depicting the same partly in section and with parts broken away;

Fig. 2 is a transverse sectional view taken along the line 2—2 of Fig. 1 and looking in the direction of the arrows; and Fig. 3 is a perspective view of a bottom of a furnace of the type shown in Fig. 1 illustrating a preferred type of water cooling jacket for a continuously open tap hole.

Referring more particularly to Fig. 1 of the drawing there is shown at 10 a vertical shaft furnace generally of the cupola type.

A plurality of tuyères 11 is arranged around the bottom of the stack.

Surrounding a lower portion of the stack 10, above and below the tuyères 11, as a water jacket 12.

A portion of the stack above the water jacket is provided with a firebrick lining 13.

Spaced around the firebrick lining, and upwardly extending to the top of the stack 10, is a jacket which constitutes an air preheater 14, in which air is heated as the result of the burning of combustion gases in the stack, as will more fully appear hereinafter. This air preheater communicates with an upper wind box 15 surrounding the top of the stack. Toward the bottom of the stack, around the area of the water jacket 12, is a lower wind box 16. The upper and lower wind boxes are connected by a conduit 17. The lower wind box communicates with the tuyères 11. The air preheater has an opening 18 to permit charging of the stack. In order to supply air for coke combustion a conventional type of blower is connected to the air preheater.

Disposed beneath the tuyères which surround the bottom of the stack is a group of oil burners 19. These oil burners, like the tuyères, enter the bottom of the stack through the water jacket 12 and are directed radially inwardly toward each other as is more fully disclosed in Fig. 2 of the drawing which shows, in its preferred modification, a series of ten of such burners. The particular significance of the oil burners will more fully appear hereinafter in connection with the operation of the furnace. It should be understood at this time, however, that while oil burners have been illustrated, any suitable burner which can utilize any fluid containing hydrogen may be employed. An equally good substitute for the oil is hydrocarbon gas. All of the burners 19 have oil inlets 20 which are connected to a common conduit (not shown). Compressed air is simultaneously supplied to the burners which are connected to a common conduit 21. The compressed air for the oil is supplied by means of a compression, or impeller, type of blower connected to the conduit 21 by the pipe line 22.

It should be noted that the furnace embodied by the present invention does not have a tap hole and spout such as that found in conventional types of cupola furnaces. This is significant because it is a chief feature of the invention that the molten rock is not tapped intermittently but is caused to run or drip continuously as long as sufficient carbonaceous material and rock phosphate is charged into the furnace. Intermittent tapping causes the disadvantageous freeze-ups and ring formation which has now been overcome by the present invention in providing continuous dripping of molten rock. To this end the present apparatus has been equipped with a so-called tap hole at the center of the bottom portion on the dump gates of the furnace. This tap hole is kept continuously open. To prevent its being enlarged by burning away, because of continuously passing of droplets of molten rock, the tap hole is surrounded by a novel water jacket structure 23 having an inlet 24 and an outlet 25 (see Fig. 3). The particular type of water jacket shown is substantially rectangular in configuration except that one portion is inclined upwardly as indicated at 26 and this particular construction aids materially in preventing formation of steam pockets and their accompanying disadvantages. As shown in Fig. 1 of the drawing the remaining portions of the furnace bottom are heavily mudded or packed with fire clay as indicated at 27.

Referring again to Fig. 3, there is illustrated two hydrocarbon gas burners 28. These consist of gas inlet pipes each surrounded by an air supply pipe. The air supply is obtained by means of a conduit communicating with the air supply conduit 22. Preferably there are two of such burners disposed adjacent opposite sides of the tap hole opening. In this instance also the hydrocarbon fluid fuel used may be oil but here a gas burner has been shown for purposes of illustration. As stated in connection with the oil burners, any fluid containing hydrogen can be used also as will more fully appear hereinafter in connection with the operation of the apparatus. It will be observed from Fig. 1 that the gas burners 28 are well protected by the fire clay 27.

At the bottom of the furnace below the tap hole is a chute 29 leading to a pit 30. In the pit is an inclined conveyor 31.

High pressure water jets, coming from a pipe disposed at the top of the chute and below the tap hole opening, are directed against the falling droplets of molten rock or slag.

In operation, predetermined amounts of coke and rock phosphate taken from a charging pit by means of a charging hoist are charged through the opening 18 at the top of the furnace after the necessary preliminary fire has been started at the bottom. The tuyères 11 supply a blast of air to the coke in this zone whereby the temperature gradually is raised above the melting point of the rock phosphate. The melting point of rock phosphate lies within the range of about 2,600° F. to 2,900° F. Maintaining a temperature above that of the melting point of the rock phosphate calls for a heat range of about 3,000° F. to 3,300° F. in a zone between the tuyères and slightly above the same. Between these temperature limits the coke not only keeps the rock molten and in liquid condition for a period of time thereafter but drives off a substantial amount of the fluorine present in the rock. Because of the looseness of the coke and rock mix which forms the burden in the stack the fluorine gas is permitted easily to escape upwardly together with other combustion gases. These combustion gases ultimately ignite and contribute to the heat within the stack, preheating other gases as well as the rock and coke in the descending burden, and also preheat the air in the preheater 14 surrounding the remaining portion of the stack. This air, being under a forced draft supplied by means of a fan type blower, is impelled through the upper wind box 15, downwardly through the conduit 17, around the lower wind box 16, and is then forced under pressure through the tuyères 11. This preheating contributes significantly to the maintenance of the necessary high temperatures required in the melting zone.

Having rendered the rock phosphate extremely molten, it is in excellent condition for the removal of residual fluorine as it trickles downwardly through the bottom of the furnace to the continuously open blast and slag outlet. In passing through the bottom of the furnace the molten rock phosphate is exposed to the air blast introduced through the tuyères 11 and also to the hot gaseous products of combustion introduced through the burners 19. The sloping sides at the bottom of the furnace which converge toward the centrally located outlet opening or tap hole tend to retain pieces of incandescent coke in the bottom of the furnace while allowing the molten rock phosphate to escape through the outlet. Freezing or chilling of the molten rock is prevented so that it can continuously be passed by gravity to and through the tap hole and removed in the form of a slag. The means for accomplishing this important feature of the invention is the utilization of a hydrocarbon fluid fuel type of burner such as the oil burner 19 herein illustrated and described. By using any type of fluid containing hydrogen, which when mixed with air will result in moisture or moisture vapor as a combustion product in this secondary zone, the invention successfully can be practiced. It appears that the moisture reacts with the fluorine and silicon within the rock phosphate to form silicon tetrafluoride and in this manner all but a small fraction of the residual fluorine can be removed. At the same time, the heat supplied by the combustion of, for example, the oil, or gas, whichever may be used, aids materially in preventing the temperature from dropping below approximately 3,000° F. which still is above the melting point of the rock phosphate. Not only is this type of fuel an aid in defluorinating the phosphatic material but it contributes materially to a successful continuous process of recovering the desired phosphatic material and thus prevents freeze-ups, as well as ring formations.

In order to insure as much fluorine removable as possible, and as well as to supply an auxiliary means for maintaining the fluidity of the molten material, there are provided the supplementary gas burners 28. Oil can be burned in these burners instead of gas, if desirable, or any fluid containing hydrogen which when mixed with air results in moisture as a combustion product. As illustrated in Fig. 3, the disposition of the gas burners adjacent the tap hole opening through the water jacket is such that the flames emanating from these burners are bent to surround the tap hole opening due to the molten rock sliding down the inclined bottom of the furnace formed by the fire clay lining 27. At this point also the combustion product of the hydrogen-containing fuel and air mixture supplies an additional amount of moisture while the rock is still highly fluid and this also contributes to the removal of additional fluorine. The additional heat supplied at this point maintains the fluidity of the molten rock until it passes through the tap hole opening.

After emanating from the tap hole opening, the molten defluorinated product initially is recovered as slag. By subjecting the slag to high pressure water jets, the same is shattered, apparently by a rearrangement of the crystal structure so that it forms finely divided particles of material containing the desired defluorinated calcium phosphate which is easily washed down the chute 29 into the pit 30 and removed by means of the conveyor 31. A suitable screen over the pit screens out pieces of coke or other impurities which have been blasted through the tap hole.

The defluorinated rock is now in a finely divided state which is a desirable condition for pulverizing so that the calcium phosphate is rendered suitable for use in animal feed.

The present process and apparatus for defluorinating phosphate rock as above described has many important advantages whereby commercial success of the project has been attained. The advantage of using coke and rock in the manner herein described allows for the free passage of combustion gases together with the fluorine. It also allows for preheating of the air going through the tuyeres and permits the process to be carried on at low pressures coming from the blower and passing through the porous burden. As far as I am aware, this process is the only one which utilizes a solid fuel such as coke as the primary source of heat in combination with a hydrocarbon fluid fuel such as oil or gas as the secondary source of heat and as the defluorinating means in the manner herein disclosed.

Another significant feature is the continuous operation of the process which eliminates intermittent tapping and consequent freeze-ups, ring formations, and other disadvantages while considerably speeding up operating conditions. The process is also economical because of the utilization of waste heat for other purposes as well as in connection with the operation of the furnace. The prevention of ring formation and freezing, as well as the prevention of burning away of the materials around the tap hole, makes it possible to increase the length of any run and consequently lowers production costs. Many of the features of the present invention could be used in other melting furnaces where solid fuels such as coke and coal, the materials herein contemplated, are used with the advantage of similarly lengthening the time of run and consequently lowering production costs.

It will thus be seen that the objects hereinbefore set forth can readily and efficiently be attained and since certain changes in carrying out the above process, and in the construction set forth which embody the invention, may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. The continuous method of defluorinating rock phosphate so as to make it suitable for animal feed, which comprises, maintaining a downwardly moving burden of rock phosphate and coke in loose condition in the vertical shaft of a blast furnace, charging additional rock phosphate and coke onto the top of said downwardly moving burden, continuously introducing a blast of air into said furnace at a level substantially above the bottom thereof so as to continuously ignite the coke and melt the rock phosphate in said burden as they reach a level adjacent said air blast introduction level, continuously introducing the hot gaseous products of combustion of a hydrocarbon fuel into said furnace below said air blast introduction level, and continuously withdrawing molten defluorinated rock phosphate slag through a continuously open blast and slag outlet opening in the bottom of said furnace, said air blast being sufficient to continuously burn all of the coke in said burden in the bottom of said furnace, maintaining the temperature in the bottom of said furnace in the range of 3,000° F. to 3,300° F. by the burning of said coke and by said hot gaseous products of combustion, and said molten rock phosphate being defluorinated as it trickles downwardly through the bottom of said furnace to said open blast and slag outlet opening.

2. The method called for in claim 1 wherein said gaseous products of combustion are obtained by burning fuel oil in a plurality of burners directed radially into said furnace.

3. The method called for in claim 2 wherein said defluorinated rock phosphate is drawn off through an orifice in the base of said furnace and the gaseous products of combustion of a hydrocarbon fuel are introduced into the stream of drops of molten rock phosphate flowing through said orifice so as to prevent said stream from solidifying in said orifice and also to reduce the amount of any fluoride remaining in said stream of molten rock phosphate.

CARL O. SCHILLING.

REFERENCES CITED

The following references are of record in the file of this patent:

UNITED STATES PATENTS

| Number | Name | Date |
|---|---|---|
| 290,343 | Morgan et al. | Dec. 18, 1883 |
| 295,355 | Collian | Mar. 18, 1884 |
| 803,737 | Baggaley | Nov. 7, 1905 |
| 1,032,763 | Newberry et al. | July 16, 1912 |
| 1,411,696 | Haege | Apr. 4, 1922 |
| 1,773,287 | Sturtevant | Aug. 19, 1930 |
| 1,902,832 | Caldwell | Mar. 28, 1933 |
| 1,925,510 | Walton | Sept. 5, 1933 |
| 2,121,776 | Baily | June 28, 1938 |
| 2,143,865 | Copson | Jan. 17, 1939 |
| 2,173,825 | Curtis | Sept. 26, 1939 |
| 2,186,718 | Ferguson | Jan. 9, 1940 |
| 2,220,575 | Luscher | Nov. 5, 1940 |
| 2,222,585 | Riggs | Nov. 19, 1940 |
| 2,360,197 | Butt | Oct. 10, 1944 |
| 2,395,231 | McNeil | Feb. 19, 1946 |
| 2,474,831 | Elmore | July 5, 1949 |

OTHER REFERENCES

Hill et al., Assoc. of Official Agricultural Chemists, vol. 28, No. 1 (1945) pages 105–18.

Certificate of Correction

Patent No. 2,539,638

January 30, 1951

CARL O. SCHILLING

It is hereby certified that error appears in the printed specification of the above numbered patent requiring correction as follows:

Column 3, line 1, for "as" read *is*; column 7, line 3, for the claim reference numeral "2" read *1*;

and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*